United States Patent [19]
Belknap

[11] Patent Number: 4,585,021
[45] Date of Patent: Apr. 29, 1986

[54] GAS FLOW RATE CONTROL REGULATOR VALVE
[75] Inventor: James L. Belknap, Muncie, Ind.
[73] Assignee: Maxon Corporation, Muncie, Ind.
[21] Appl. No.: 579,262
[22] Filed: Feb. 13, 1984
[51] Int. Cl.[4] ............................................. G05D 11/03
[52] U.S. Cl. .................... 137/100; 251/282; 431/90
[58] Field of Search .............. 137/100, 98; 251/282; 74/10.7; 431/19, 90

[56]  References Cited
U.S. PATENT DOCUMENTS

| 1,788,925 | 1/1931 | McKee | 137/98 |
|---|---|---|---|
| 2,382,625 | 8/1945 | Garretson | 261/69 |
| 2,432,274 | 12/1947 | Barr | 261/41 |
| 2,704,572 | 3/1955 | Downe | 431/90 |
| 2,720,378 | 10/1955 | Otto | 251/61 |
| 2,852,032 | 9/1958 | Moore | 137/98 |
| 2,873,173 | 2/1959 | Neumeyer | 23/281 |
| 2,960,995 | 11/1960 | Hague | 137/83 |
| 3,002,550 | 10/1961 | Schreter | 158/28 |
| 3,007,516 | 11/1961 | Turpin | 158/76 |
| 3,013,767 | 12/1961 | Dehaven | 251/122 |
| 3,045,745 | 7/1962 | Turpin | 158/76 |
| 3,158,998 | 12/1964 | Robinson | 60/35.6 |
| 3,304,048 | 2/1967 | Roberts | 251/282 |
| 3,404,702 | 10/1968 | Telford | 137/100 |
| 3,419,339 | 12/1968 | Schreter | 431/284 |
| 3,493,005 | 2/1970 | Kakegawa | 137/100 |
| 3,561,483 | 2/1971 | Taplin | 251/282 |
| 3,630,224 | 12/1971 | Kalvelage | 137/375 |
| 3,709,461 | 1/1973 | Johnson | 251/58 |
| 3,724,504 | 4/1973 | Matsui | 138/46 |
| 3,945,302 | 3/1976 | Downs | 92/13.2 |
| 4,020,861 | 5/1977 | Shihabi | 137/100 |
| 4,208,981 | 6/1980 | Coha et al. | 74/10.7 |
| 4,302,178 | 11/1981 | Belknap | 431/19 |
| 4,385,887 | 5/1983 | Yamamoto et al. | 431/90 |

FOREIGN PATENT DOCUMENTS

| 621813 | 8/1962 | Belgium | 431/19 |
|---|---|---|---|
| 2708858 | 9/1978 | Fed. Rep. of Germany | 431/90 |

Primary Examiner—Robert G. Nilson
Attorney, Agent, or Firm—Robert M. Ward

[57] ABSTRACT

The improved gas flow rate control regulator valve of the present invention maintains an optimum precombustion air to gas mass ratio for a wide range of air and gas flows within the combustion chamber of a furnace for efficient burning. The regulator valve of the present invention includes at least one piston diaphragm chamber containing a control piston for equalizing the pressure of the gas effluent with that of the precombustion air in a first preferred embodiment. In a second preferred embodiment, a bottom control piston chamber containing a piston of a size greater than the size of the top control piston is provided such that amplifier means for increasing the gas pressure are provided for application where the gas pressure to the combustion chamber must be greater than the pressure of the available precombustion air. In a third preferred embodiment, the present invention functions as a mass flow regulator suitable for use in connection with two pneumatic impulse lines, which are disposed on opposite sides of a restrictor disposed within the line in order to detect the pressure differential across the restrictor.

13 Claims, 5 Drawing Figures

GAS FLOW RATE CONTROL REGULATOR VALVE

BACKGROUND OF THE INVENTION

The present invention relates generally to gas pressure regulator valves and more particularly to an improved gas flow rate control regulator valve for maintaining an optimum precombustion air to gas ratio for a wide range of air and gas flows within the combustion chamber of a furnace for efficient burning therewithin. Several exemplary embodiments of the present invention are disclosed hereinbelow.

To accomplish efficient combustion of gaseous fuels, an optimum air to fuel mass ratio must be maintained over a wide range of air and fuel flow in the system. If air and fuel gas temperatures are similar the optimum ratio may be achieved simply by mechanically linked air and gas valves.

To achieve further efficiency, however, energy in combustion by-products must be utilized to heat combustion air prior to combustion, and thereby recuperate a portion of the heat usually wasted. When air is heated without volume constraints, it expands, becoming less dense, and therefore has low mass per unit volume. When mechanically linked air and fuel valves are used, varying combustion air temperatures will change the air to fuel ratio from optimum, since fuel gas temperature is usually in the ambient range.

To solve these and other problems, the prior art teaches a wide variety of regulator valve mechanisms. Many of the prior art mechanisms include devices which will function over only a narrow range of air and gas flows. Additionally, many such prior art devices have the further disadvantages of inaccuracy during use, undependability in the field, necessitation of frequent maintenance, and complexity of structure leading to increased initial expense.

In addition, many such prior art regulator valves for mechanisms have required excessively lengthy dimensions because of the multiplicity of the various parts necessary to insure accuracy and dependability, and in some cases such excessive dimensions have prevented the utilization of the devices in circumstances wherein there was insufficient space.

SUMMARY OF THE PRESENT INVENTION

The present invention relates to an improved gas flow regulator designed to be linked pneumatically to sense a varying pressure differential across a restriction placed in the conduit which feeds combustion air to the combustion system. Since the air flow through the restriction is proportional to the pressure differential across it, and since the restriction is placed in a zone of ambient temperature prior to heating the combustion air, the air mass flowing through the restriction is also proportional to such pressure differential.

Further, the present invention is designed to regulate gas pressure, and hence gas flow, to be proportional to air pressure, and hence, air flow. Prior art devices typically regulate gas flow by varying the distance of a flat disc laterally from a stationery circular orifice of somewhat smaller diameter. The distance varies from a minimum of zero where the orifice is closed, to a maximum of ¼ the diameter of the orifice, beyond which it can be shown, no further increase in area, and therefore flow, is obtained.

Further, in the prior art, the valve disc is connected to and moved by a flat flexible diaphragm which limits the disc's linear travel. The resulting short disc travel relative to orifice diameter severely limits the range of accurate flow control.

The improved gas flow regulator of the present invention corrects these two major deficiencies and other deficiencies. Instead of a flat disc covering the valve orifice, an elongated plug, approximating a truncated ellipsoid in form, plugs the orifice at minimum flow and is gradually withdrawn from the orifice to increase flow. The distance traveled by the valve plug between maximum and minimum flow is determined by the major and minor axis dimensions of the ellipsoidal cross section and is typically equal to the orifice diameter, or four (4) times that of prior art regulators. Since a flat diaphragm operator will not accommodate the larger linear travel of the valve mechanism, a piston traveling within a cylinder is used instead. To isolate the various pressurized chambers, and to minimize friction, a rolling elastomer seal is used between each piston and its associated cylinder wall.

Prior art devices typically use a long tubular housing projecting vertically from the upper surface of the regulator to accommodate the adjusting or null point spring. In many cases this tubular projection is longer than the regulator body and combined housing, thereby doubling the necessary space required for installation in the pipe train. In the present invention, the adjusting or null point spring, emerges vertically from the upper surface of the cylinder head, rolls over pulleys, and then changes direction from vertical to horizontal, thus minimizing mounting space requirements.

The improved gas flow rate control regulator valve of the present invention, and the exemplary embodiments thereof, may be more completely understood with reference to the following drawing, the detailed description of preferred embodiments, and the appended claims.

BRIEF DESCRIPTION OF THE DRAWING

Exemplary embodiments of the improved gas flow rate control regulator valve of the present invention are illustrated in the following drawing, in which.

DETAILED DESCRIPTION OF PREFERRED EMBODIMENTS

Figure 1:
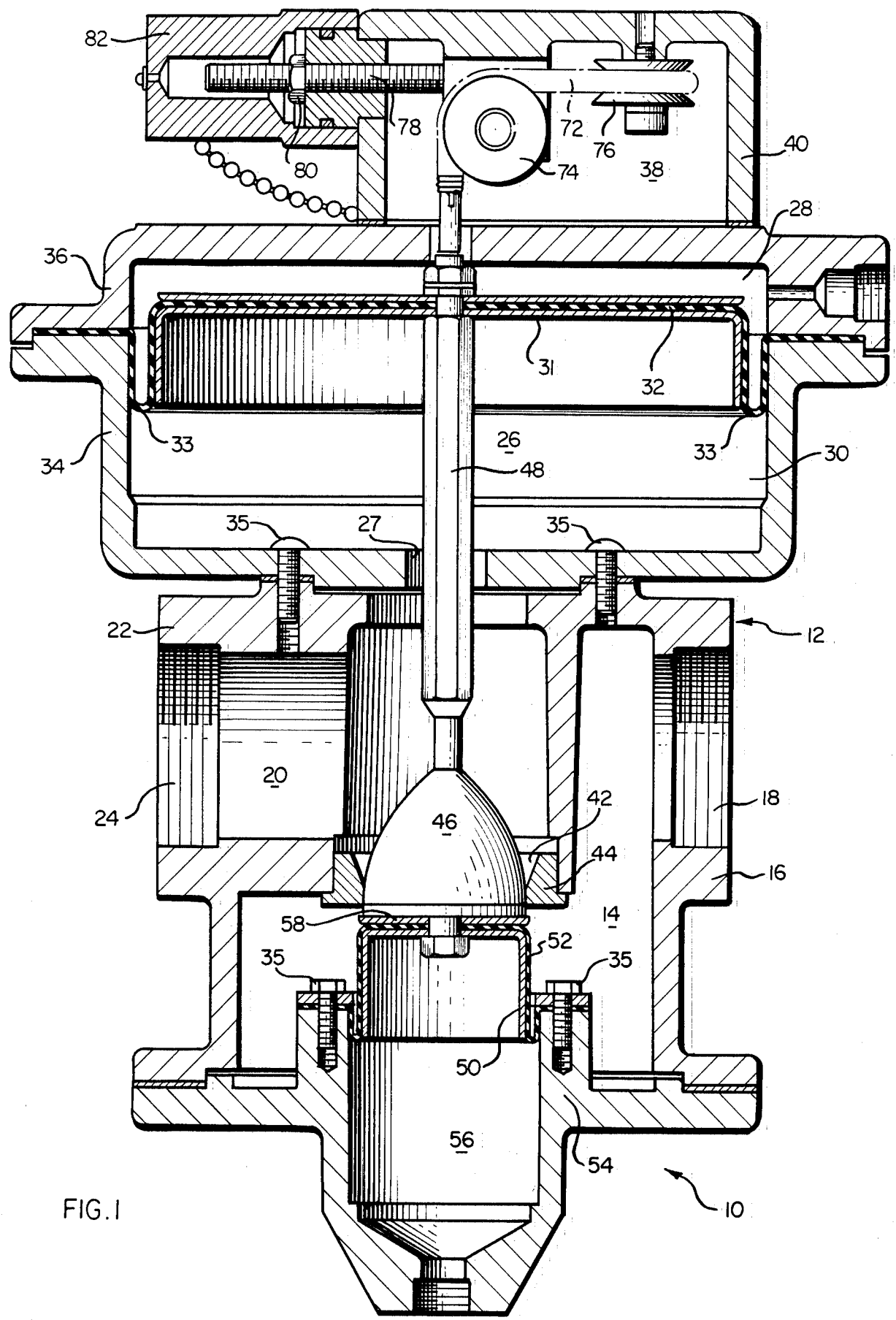
FIG. 1 is a longitudinal cross-sectional view of one preferred embodiment of the improved gas flow rate control regulator valve of the present invention illustrating a single, top-disposed control piston chamber, with a null point means chamber and mechanism disposed thereabove, and with a smaller balancing piston disposed therebelow.

There are four distinct configurations or preferred embodiments of the present invention, each to be available, not limited to, standard pipe sizes from $\frac{3}{4}''$ through 3".

The first preferred embodiment is the cross connected configuration. This embodiment is designed with a provision for connecting to one pneumatic impulse line from the air supply conduit of a combustion system between the air control valve and the combustor. As the air control valve varies the air flow, the resulting changes in air pressure are sensed by the present invention which provides an equal gas pressure output. Since the air and gas pressures are maintained equal, their corresponding flows are proportional. This proportionality is maintained regardless of inevitable changes in combustion chamber pressures, which would destroy the proportionality in a system controlled by mechanically linked air and fuel gas valves.

In such first preferred embodiments, two pistons are provided. The main, top-disposed control piston is subjected to gas pressure downstream of the valve orifice on its lower side, and the variable air pressure impulse from the combustion air line on its upper side. Thus, air impulse input and gas pressure output are equal, since they are imposed on equal piston area.

The inlet gas pressure imposes a force on the lower surface of the valve plug which, if not countered, would reduce gas outlet pressure below optimum. Therefore a small balancing piston is provided so that gas inlet pressure imposes a force on it equal and opposed to the force on the plug.

A vertical shaft rigidly connects the valve plug and pistons.

An adjustable extension spring suspends the entire piston and plug assembly. Since the force of gravity on the moveable valve parts would tend to increase gas output pressure above optimum, the spring is designed to counter this force, and hence to serve as a null point means.

All preferred embodiments of the improved gas flow rate control regulator valve of the present invention are preferably utilized in conjunction with a gas burning furnace, and function to maintain an optimum precombustion air to gas mass ratio over a wide range of air and gas flows within the combustion chamber of the furnace. Efficient burning of the gas within the combustion chamber results. The regulator valve of the present invention includes a valve housing. The valve housing has a gas influent chamber, and a gas effluent chamber.

The gas effluent chamber is disposed for operative connection to the gas influent chamber and is connected to the combustion chamber of the furnace. The valve housing contains at least one piston chamber to define subchambers separated by the piston. At least one of the piston chambers comprises a top control piston chamber and is disposed above the gas effluent chamber and communicates therewith. Such preferred embodiments include a null point means chamber disposed generally above the top control piston chamber, as described more fully hereinbelow.

A valve orifice defined by a valve seat is disposed between the gas influent chamber and the gas effluent chamber for flow of gas therethrough. A valve plug is disposed generally in spaced relationship with respect to the valve orifice to open a variable transverse cross-sectional area of the valve orifice to flow by the gas influent stream therethrough. The flow rate through the valve orifice is variable and is proportional to the amount of transverse cross-sectional area of the valve orifice which has been exposed by moving of the valve plug.

A valve stem is connected to and supports the plug for reciprocating and generally vertical motion of the valve plug relative to the valve orifice. A piston is disposed in each of the piston chambers, the pistons being connected to and supported by the valve stem.

Flexible diaphragm means are sealingly disposed within each of the piston chambers to define therein a lower subchamber and an upper subchamber. Accordingly, an increase in the pressure of the fluid in an upper subchamber tends to urge the valve plug downwardly to increase the open area of the valve orifice, and to thus increase the flow of gas therethrough, and as a result to increase the pressure of the effluent gas flowing through the valve and to the combustion chamber. Contrastingly and oppositely, an increase in the pressure of the fluid in a lower subchamber tends to urge the valve plug upwardly to decrease the flow of gas through the valve orifice, and hence to decrease the pressure of the effluent gas made available to the combustion chamber of the furnace. At least one of the upper subchambers is connected to the precombustion air, and at least one of the lower subchambers is connected to the effluent gas chamber.

A null point means is further provided for equalizing and balancing against the downward force of gravity disposed within the null point means chamber above the top control piston chamber. Such null point means is described in greater detail hereinbelow.

Preferred embodiments of the improved gas flow rate control regulator valve of the present invention further include a balancing piston connected to and disposed in space relationship from the underside of the valve plug. The balancing piston is connected to a balancing diaphragm which is sealingly disposed within the influent gas chamber to define a balancing subchamber therebelow, and which contains ambient air. The balancing piston functions when the force of the influent gas on the undersurface of the valve plug tending to urge the valve plug upwardly is equalized by the downward force of the pressure of the gas contained within the influent chamber upon the balancing piston. In such preferred embodiments, the air contained within the balancing subchamber is supplied by and connected to the ambient atmosphere.

In a first preferred embodiment of the present invention, there is a single control piston chamber, which said single control piston chamber is disposed above the gas effluent chamber and communicates therewith.

In such first preferred embodiment, the upward chamber of the top control piston chamber is connected to the precombustion air and the lower subchamber thereof is connected to the effluent gas. In such systems, an increase in pressure of the precombustion air urges the piston and the connected valve stem downwardly, which also urges the valve plug downwardly to open the valve orifice to a greater degree to the gas influent stream therethrough. In turn, the gas impinges upon the undersurface of the piston within the lower piston subchamber to urge the piston upwardly to balance the downward force exerted by the precombustion air. Thus, in such embodiments the pressure of the effluent gas stream is equalized with the pressure of the precombustion air, and hence the flow rates thereof are equalized into the combustion chamber of the furnace.

In these and other preferred embodiments, the valve plug has the shape of a solid of revolution formed by rotating a convexly curved surface which intersects the longitudinal axis of the valve stem about the longitudinal axis, to thus generate a generally ellipsoidal shape. Such convexly curved surface may preferably comprise an arc of a circle less than about 90 degrees, a hyperbolic curve, a parabolic curve, or an elliptical curve.

A second preferred embodiment of the regulator valve of the present invention is the cross connected configuaration having amplifier means associated therewith. This second preferred embodiment is especially useful in certain combustion systems, wherein the combustor may require gas pressure that is greater than the air pressure available. In this embodiment, the air and gas pressure must react on separate pistons, so a third, lower bottom-disposed control piston is provided. As in the previous configuration, the force imposed by air pressure on the lower (air) piston is opposed to the force imposed by gas pressure on the upper (gas) piston. However, since the gas piston is of lesser area, greater force is required by gas pressure to oppose the force imposed by the air pressure. The gas output pressure is therefore greater than the air impulse pressure by a factor in inverse proportion to the areas of the respective pistons.

As in the first preferred embodiment, a small, balancing piston and adjustable spring or null point means are employed for like reasons.

In such second preferred embodiment of the regulator valve of the present invention, as indicated the gas pressure required at the combustor is greater than the pressure of the available precombustion air. Accordingly, such regulator valve includes amplifier means for increasing the gas pressure. In such second preferred embodiment such control pistons are disposed within two control piston chambers, a top control piston chamber disposed above the gas effluent chamber, and a bottom control piston chamber, disposed beneath the balancing subchamber and communicates therewith. The top control piston is disposed within the top control piston chamber and is smaller in area than that of the bottom piston which is disposed within the bottom control piston chamber. In such second preferred embodiments, the upper subchamber of the bottom piston chamber communicates with the precombustion air. An increase in the pressure of the precombustion air tends to urge the valve plug downwardly into an increasingly open position to increase the flow of gas therethrough into the effluent chamber. The gas enters the effluent gas chamber and fills the communicating lower subchamber of the top piston chamber for balance against the variable precombustion air pressure of the top subchamber of the lower piston chamber. The pressure of the effluent gas is increased in proportion to the inverse ratio between the respective areas of the top and bottom pistons.

In such second preferred embodiment, the upper subchamber of the top control piston chamber and the lower subchamber of the bottom control piston chamber are open to the ambient air.

In a third preferred embodiment of the regulator valve of the present invention, such regulator valve functions as a mass flow regulator suitable for use in connection with two pneumatic impulse lines. Such a mass flow regulator is designed with provisions for connecting two pneumatic impulse lines to a restrictor in the combustion air conduit, thus sensing a pressure differential across the restrictor. As the combustion air flow is varied by a suitable air control valve, the pressure differential across the restrictor also varies in proportion to the air flow and imposes a force on a control piston in the present invention.

An opposing force is imposed on a second control piston by the gas pressure downstream of the orifice in the present invention, thus the gas output pressure is equal to the air restrictor pressure differential. Since the air restrictor is located in a portion of the combustion air conduit subject to the same ambient temperature condition as the regulator in the present invention, the gas mass flow through the present invention is maintained proportional to the air mass flow through the restrictor which thereafter flows to the combustor.

The proportionality is thus maintained by the regulator of the present invention regardless of the temperature of the combustion air entering the combustor, even when elevated to high temperature by recuperated waste heat.

As in previous embodiments, a small balancing piston and adjustable spring or null point means are employed for like reasons. An additional small compensating piston is required to compensate for an imbalance caused by the force imposed by air pressure on the lower side of the small balancing piston.

As indicated, such pneumatic mass flow regulators comprising such third preferred embodiments include two pneumatic impulse lines. Each of the pneumatic impulse lines is disposed on a side of a restrictor disposed within the conduit. The pneumatic impulse lines function to detect the pressure differential across the restrictor. In such embodiments, a top control piston chamber disposed above the gas influent chamber is provided. A bottom control piston chamber disposed beneath the balancing subchamber is also provided. In such mass flow regulator embodiments of the present invention, the upper chamber of the bottom control piston chamber communicates with the high pressure pneumatic impulse line disposed upstream of the restrictor. The lower chamber of the bottom control piston communicates with the lower pressure pneumatic impulse line disposed downstream of the restrictor. Thus, the relative position of the bottom piston within the bottom control piston chamber reflects the pressure differential between the upstream and downstream sides of the restrictor. Such pressure differential is equalled by the effluent gas pressure emanating from the effluent gas chamber as determined by the corresponding relative position of the top control piston within the top control piston chamber.

A fourth preferred embodiment is provided in the form of a mass flow regulator including amplifier means. The construction and usage are similar to those of the mass flow regulator third embodiment, supra, except that the gas (upper) piston is of a smaller area than the air (lower) piston. Therefore, as in the above third embodiment, the gas output pressure is greater than, in this case, the restrictor pressure differential by a factor in inverse proportion to the areas of the respective pistons.

As in the third embodiment, supra, a small balancing piston, an adjustable spring, to serve as a null point means, and a second small compensating piston are employed for like reasons.

In such a fourth preferred embodiment of the regulator control valve of the present invention, the mass flow regulator as set forth in the third embodiment, supra, further includes means for amplifying the effluent gas pressure to an amount greater than the pressure differential across the restrictor. In such fourth preferred embodiments, the top control piston has an area less than that of the bottom control piston, and in an amount in inverse proportion to the increase in effluent gas pressure over the pressure differential across the restrictor.

In conjunction with any of the above embodiments or other preferred or alternative forms of regulator valve, an improved null point means may be provided. Such improved null point means preferably include a coil spring connected at the distal end thereof to the upper end of the valve stem. A first roller is supported within the null point means chamber and has a generally horizontal axis of rotation, with the coil spring disposed over the first roller. A second roller is supported within the null point means chamber and has a generally vertical axis of rotation, with the coil spring also disposed around the second roller. An adjustment means, preferably in the form of screw operated means, is connected to the proximal end of the coil spring for providing variable tension on the coil spring to effectuate an upward force on the valve stem which is equal to and opposite of the downward force of gravity on the valve stem and other supported elements.

In such null point means, the first and second rollers are generally mutually tangentially aligned. Specifically, the second roller is generally tangentially aligned with the first roller in a generally horizontal plane, and the first roller is generally tangentially aligned with the second roller in a generally vertical plane—all of which serves to minimize frictional binding of the coil spring.

Referring now to the drawing and to FIG. 1 in particular, and wherein corresponding reference numerals are utilized to designate common elements, the improved gas flow rate control regulator valve of the present invention generally 10, is utilized in conjunction with a gas burning furnace (not shown). Such regulator valve 10 functions to maintain an optimum precombustion air to gas mass ratio over a wide range of air and gas flows within the combustion chamber of the furnace for efficient burning of the gas within the combustion chamber.

Regulator valve 10 of the present invention includes a valve housing 12. Valve housing generally 12 has a gas influent chamber 14 defined by gas influent chamber housing 16 connected to threaded gas influent means 18. A gas effluent chamber 20 defined by gas effluent housing 22 connected to threaded gas effluent means 24 is provided. Gas effluent chamber 20 is disposed for operative connection to gas influent chamber 14 and is further connected to the combustion chamber of the furnace. Valve housing 12 contains a top control piston chamber 26 having upper and lower subchambers 28, 30 separated by a control diaphragm 32. Top control piston chamber 26 is defined by top control piston chamber housing 34, 36. Top control piston chamber 26 is disposed above gas effluent chamber 20 and communicates therewith by means of aperture 27. Such preferred embodiments further include a null point means chamber 38 disposed generally above top control piston chamber 26, and defined by null point means chamber housing 40.

A valve orifice 42 defined by a valve seat 44 is disposed between gas influent chamber 14 and gas effluent chamber 20 for flow of gas therethrough. A valve plug 46 is disposed generally in spaced relationship with respect to valve orifice 42 to open a variable transverse cross-sectional area of valve orifice 42 to flow by the gas influent stream therethrough. The flow rate through valve orifice 42 is variable and is proportional to the amount of transverse cross-sectional area of valve orifice 42 which has been exposed by moving of valve plug 46. A valve stem 48 is connected to and supports valve plug 46 for reciprocating and generally vertical motion of valve plug 46 relative to valve orifice 42.

Top control piston 31 is disposed in top control piston chamber 26 and is connected to and supported by valve stem 48.

Flexible diaphragm 32 is sealingly disposed between the abutting peripherals of top control piston chamber housing 34, 36 and includes a rolled lip 33 for extensability of range. The respective housing elements may be secured by means of bolts 35. Accordingly, an increase in the pressure of the fluid in upper subchamber 28 tends to urge valve plug 46 downwardly to increase the open area of valve orifice 42, and to thus increase the flow of gas therethrough, and as a result to increase the pressure of the effluent gas flowing through valve 10 and to the combustion chamber. Contrastingly and oppositely, an increase in the pressure of the fluid in lower subchamber 30 tends to urge valve plug 46 upwardly to decrease the flow of gas through valve orifice 42, and hence to decrease the pressure of the effluent gas made available to the combustion chamber of the furnace. Upper subchamber 28 in the embodiment of FIG. 1 is connected to the precombustion air, and the lower subchamber 30 of the embodiment of FIG. 1 is connected to effluent gas chamber 20.

Regulator valve 10 of the present invention further includes a balancing piston 50 connected to and disposed in space relationship from the underside of valve plug 46. Balancing piston 50 is connected to a balancing diaphragm 52 which is sealingly disposed within the influent gas chamber 14 between gas influent chamber housing 16 and balancing subchamber housing 54 to define a balancing subchamber 56, which is open to the ambient atmosphere. Balancing piston 50 functions when the force of the influent gas on the undersurface 58 of valve plug 46 tending to urge valve plug 46 upwardly is compensated for by the downward force of the pressure of the gas contained within influent chamber 14 upon the balancing piston 50.

Figure 2:
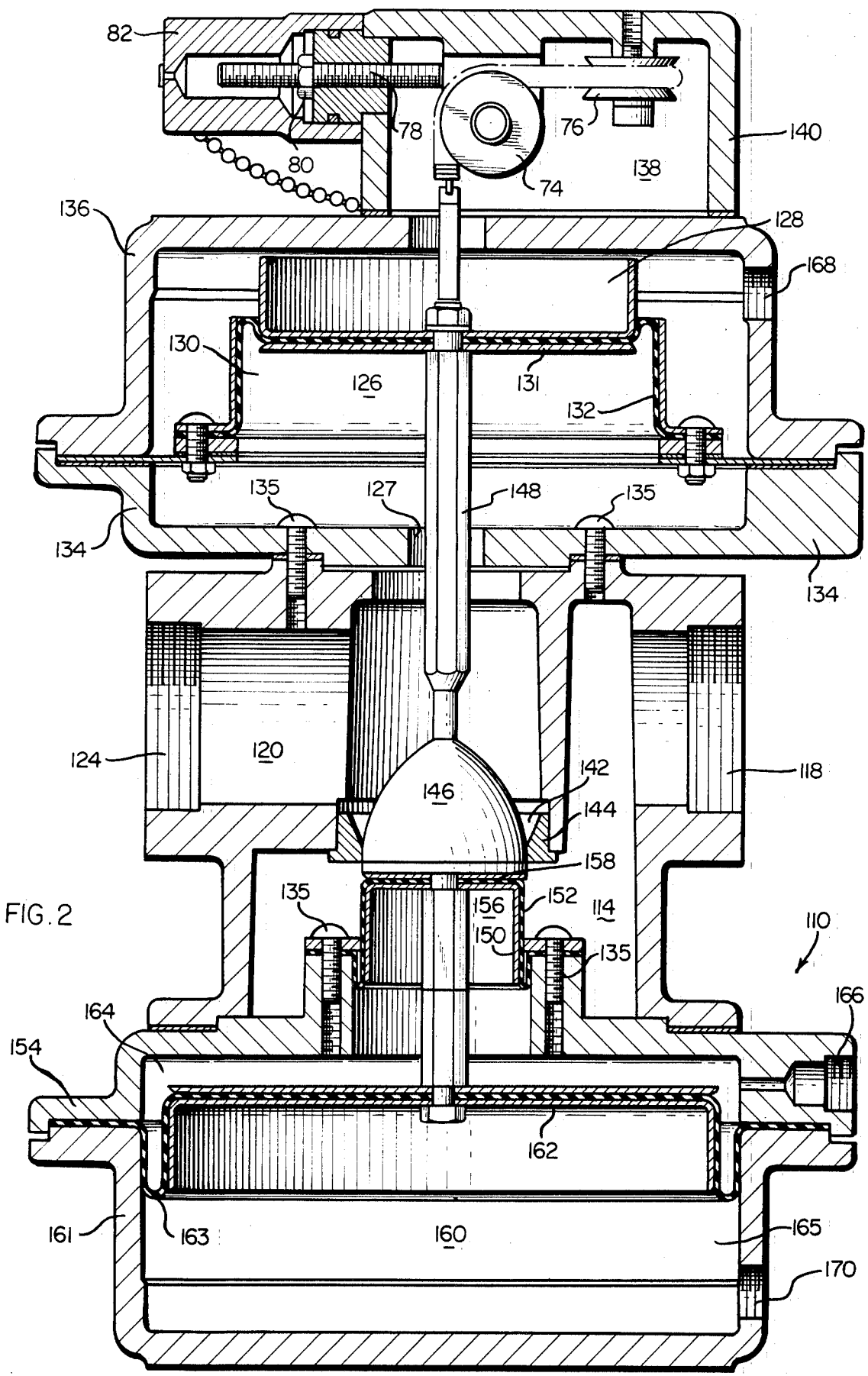
FIG. 2 is a longitudinal cross-section view of a second preferred embodiment of the improved gas flow rate control regulator valve of the present invention, which embodiment is especially useful when the gas pressure required at the combustor is greater than the pressure of the available precombustion air, and which embodiment includes a second lower disposed bottom control piston, which piston is larger in surface area than that of the top-disposed control piston, such that the upper subchamber of the bottom control piston is open to the precombustion air to balance against the gas pressure on the smaller top-disposed control piston, whereby an amplification of the gas pressure is obtained in an amount determined by the ratio of area between the bottom control piston and the top control piston.

Referring now to FIG. 2 a second embodiment generally 110 of the regulator valve of the present invention, the gas pressure required by the combustor is greater than the pressure of the available precombustion air. Such regulator valve 110 includes amplifier means for increasing the gas pressure. In such second preferred embodiment 110, two control piston chambers are provided, a top control piston chamber 130 disposed above gas effluent chamber 120, and a bottom control piston chamber 160, which is disposed beneath balancing subchamber 156 and communicates therewith. Bottom control piston chamber 160 is defined by bottom control piston chamber housing 161 which articulates with balancing subchamber housing 154 to support bottom diaphragm 163 therebetween. Top control piston 131 is disposed within top control piston chamber 130 and is smaller in area than that of bottom piston 162 disposed within the bottom control piston chamber 160.

In the embodiment of FIG. 2, the upper subchamber 164 of bottom piston chamber 160 communicates with the precombustion air at orifice 166. An increase in the pressure of the precombustion air entering at orifice 166 tends to urge valve plug 146 downwardly into an increasingly open position to increase the flow of gas therethrough into gas effluent chamber 120. The gas enters effluent gas chamber 120 and fills the communicating lower subchamber 130 of top piston chamber 126 for balance against the variable precombustion air pressure of top subchamber 164 of lower piston chamber 160. The pressure of the effluent gas is increased in proportion to the inverse ratio between the respective areas of top piston 131 and bottom piston 162.

In the embodiment of FIG. 2, the upper subchamber 128 of top control piston chamber 126 and lower subchamber 165 of bottom control piston chamber 160 are open to the ambient atmosphere at orifice 168 and 170 respectively.

Figure 3:
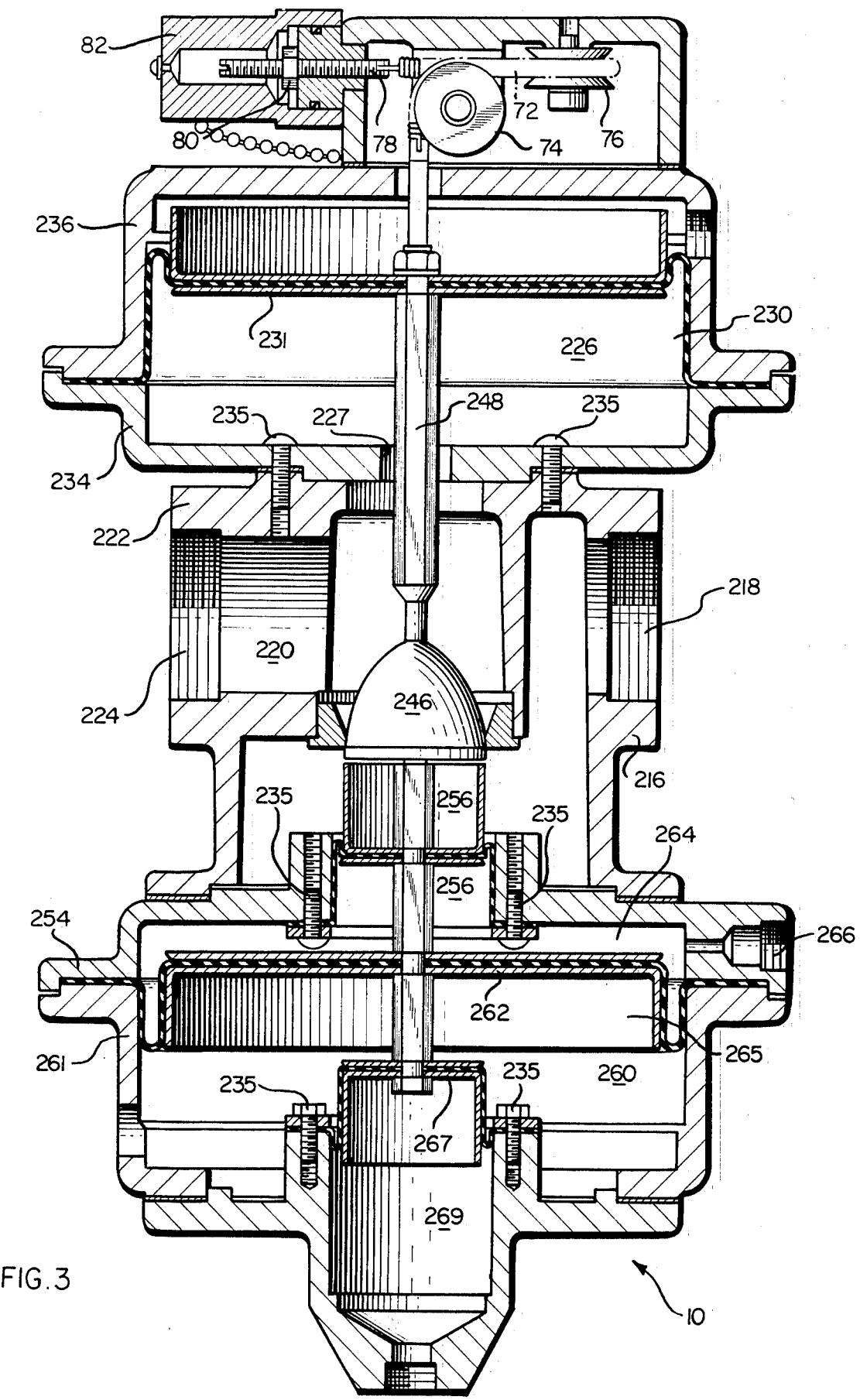
FIG. 3 is a longitudinal cross-section view of a third preferred embodiment of the improved gas flow rate control regulator valve of the present invention, wherein the functioning of such embodiment is that of a mass flow regulator for use in connection with two pneumatic impulse detection means, each of which means is disposed on a side of a restrictor disposed within the line in order to detect the pressure differential across the restrictor, and wherein the upper subchamber of the bottom control piston is connected by conduit to the high pressure air on one side of the pressure restrictor, and the lower subchamber of the bottom control piston is connected by conduit to the low pressure line from the downstream side of the restrictor, such that the bottom disposed control piston position is determined by the pressure drop across the restrictor, which pressure drop is balanced against the pressure of the effluent gas stream as contained within the top control piston chamber.

The embodiment of FIG. 3 is directed to pneumatic mass flow regulators which include two pneumatic impulse lines. Each of the pneumatic impulse lines is disposed on a side of a restrictor disposed within the conduit. The pneumatic impulse lines function to detect the pressure differential across the restrictor. In the embodiment of FIG. 3, a top control piston chamber 226 disposed above gas influent chamber 220 is provided. A bottom control piston chamber 260 disposed beneath balancing subchamber 256 is also provided.

In such mass flow regulator embodiments of the present invention as shown in FIG. 3, the upper chamber 264 of bottom control piston chamber 260 communicates with the high pressure pneumatic impulse line disposed upstream of the restrictor. The lower chamber 265 of bottom control piston chamber 260 communicates with the lower pressure pneumatic impulse line disposed downstream of the restrictor. Thus, the relative position of bottom piston 262 within bottom control piston chamber 260 reflects the pressure differential between the upstream and downstream sides of the restrictor. Such pressure differential is equalled by the effluent gas pressure emanating from effluent gas chamber 220 as determined by the corresponding relative position of top piston 231 within top control piston chamber 226. A supplemental compensating piston 267 contained within supplemental compensating piston chamber 269 is provided for purposes as set forth above. Other elements of the third preferred embpdiment as depicted in FIG. 3 generally correspond with those depicted in FIGS. 1 and 2 and thus are correspondingly designated.

Figure 4:
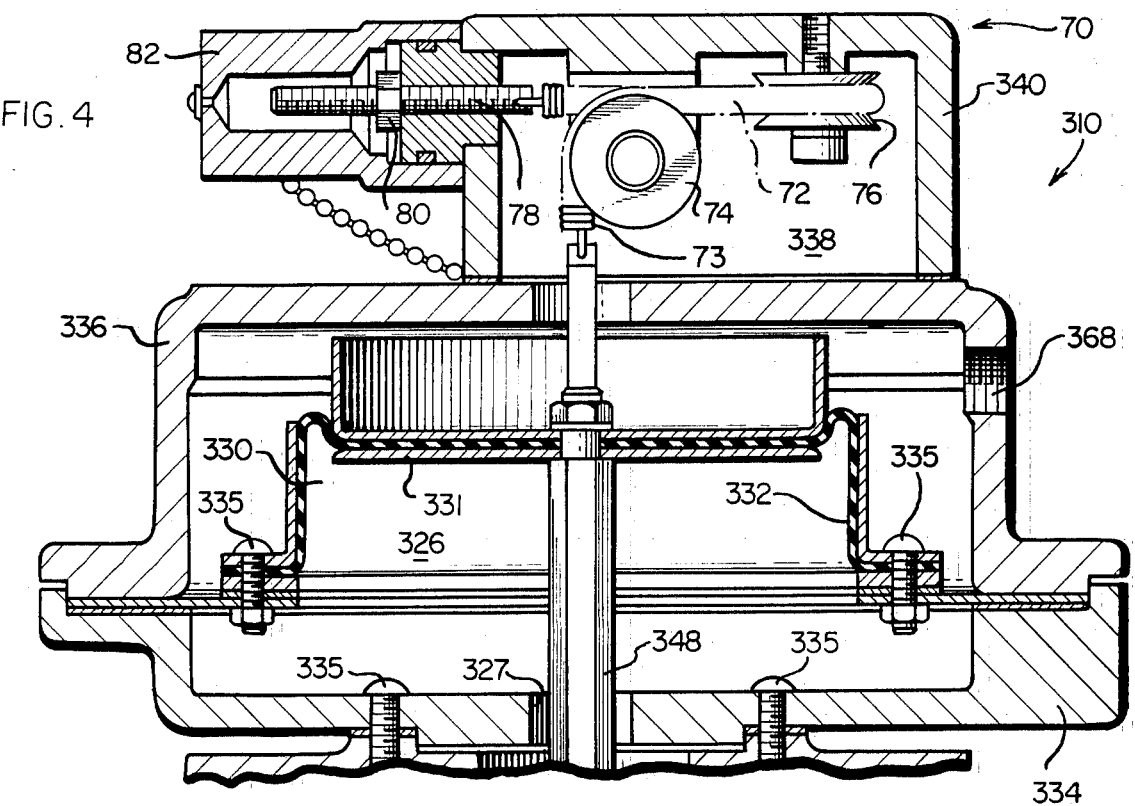
FIG. 4 is a fragmented longitudinal cross-sectional view of a fourth preferred embodiment similar to the embodiment of the improved gas flow rate control regulator valve functioning as a mass flow regulator and as depicted in FIG. 3, and further containing means for amplifying the effluent gas pressure to an amount greater than the pressure differential across the restrictor by providing a top control piston which has an area less than that of the bottom control piston.
Figure 5:
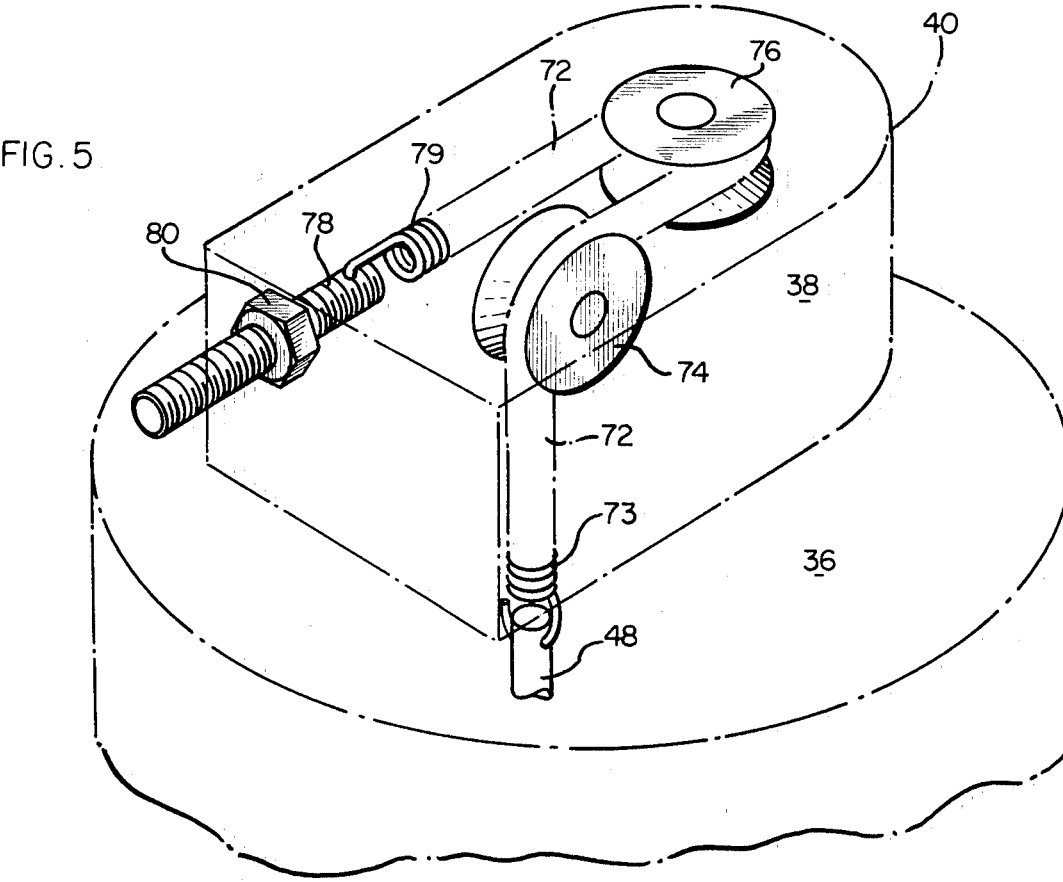
FIG. 5 is an enlarged perspective view of the reduced height null point means of the present invention with the respective housings depicted schematically, and further illustrating mutual tangential alignment between the second roller and the first roller in respective horizontal and vertical planes for minimizing frictional binding of the coil spring.

In a fourth preferred embodiment of the regulator valve 310 of the present invention as shown in FIG. 4, the mass flow regulator as set forth in the third embodiment of FIG. 3, supra, may also include means for amplifying the effluent gas pressure to an amount greater than the pressure differential across the restrictor. In such fourth preferred embodiment, the top control piston 331 has an area less than that of the bottom control piston (not shown), and in an amount in inverse proportion to the increase in effluent gas pressure over the pressure differential across the restrictor.

In conjunction with any of the above embodiments or other forms of the regulator valve 10, 110, 210, 310, an improved null point means generally 70 may be provided. Such improved null point means 70 include a coil spring 72 connected at the distal end 73 thereof to the upper end of valve stem 48. A first roller 74 is supported within null point means chamber 38 and has a generally horizontal axis of rotation, with coil spring 72 disposed over first roller 74. A second roller 76 is supported within null point means chamber 38 and has a generally vertical axis of rotation, again with coil spring 72 disposed around second roller 76. An adjustment means in the form of a bolt 78 secured by a nut 80 is connected to the proximal end 79 of the coil spring 72 for providing variable tension on coil spring 72 to effectuate an upward force on valve stem 48 which is equal to and opposite of the downward force of gravity on valve stem 48 and other supported elements. In such improved null point means 70, first and second rollers 74, 76 are generally mutually tangentially aligned. Specifically, second roller 76 is generally tangentially aligned with first roller 74 in a generally horizontal plane, and first roller 74 is generally tangentially aligned with second roller 76 in a generally vertical plane—all of which serves to minimize frictional binding of coil spring 72. A cap 82 for covering adjustment bolt 78 may preferably be provided to shield the same from the elements.

The basic and novel characteristics of an improved gas flow rate control regulator valve of the present invention will be readily understood from the foregoing disclosure by those skilled in the art. It will become readily apparent that various changes and modifications may be made in the form, construction and arrangement of an improved gas flow rate control regulator valve of the present invention as set forth hereinabove without departing from the spirit and scope of the invention. Accordingly, the preferred and alternative embodiments of the present invention set forth hereinabove are not intended to limit such spirit or scope in any way.

What is claimed is:

1. An improved gas flow rate control regulator valve for a gas burning furnace for maintaining an optimum precombustion air to gas mass ratio over a wide range of air and gas flows within the combustion chamber of the furnace for efficient burning therewithin, said regulator valve comprising:

a valve housing having a gas influent chamber, a gas effluent chamber disposed for operative connection to said gas influent chamber and connected to the combustion chamber of the furnace, said valve housing containing at least one piston diaphragm chamber to define subchambers separated by a flexible diaphragm, at least one said piston chamber comprising a control piston chamber and disposed above said gas effluent chamber and communicating therewith;

a null point means chamber disposed generally above said top control piston chamber;

a valve orifice defined by a valve seat disposed between said gas influent chamber and said gas effluent chamber for flow of gas therethrough;

a valve plug movably disposed generally in spaced relationship to said valve orifice to open a variable transverse cross-sectional area of said valve orifice to flow of the gas influent stream therethrough at a variable flow rate proportional to the amount of transverse cross-sectional area of said valve orifice exposed by said movably disposed valve plug;

a valve stem connected to and supporting said valve plug for reciprocating an generally vertical motion of said valve plug relative to said valve orifice;

a piston disposed in each said piston chamber, said piston connected to and supported by said valve stem;

said flexible diaphragm articulating with a corresponding piston and sealingly disposed within each said piston chamber to define therein a lower subchamber and an upper subchamber, whereby an increase in the pressure of the fluid in each said upper subchamber tends to urge said valve plug downwardly to increase the open area of the valve orifice, to increase the flow of gas therethrough, and hence to increase the pressure fo the effluent gas flowing through the valve and to the combustion chamber, and wereby an increase in the pressure of the fluid in each said lower subchamber tends to urge said valve plug upwardly to decrease the flow of gas through said valve orifice and hence to decrease the pressure of the effluent gas made available to the combustion chamber of the furnace, at least one said upper subchamber connected to the precombustion air, and at least one said lower subchamber connected to the effluent gas chamber;

a null point means for equalizing and balancing against the downward force of gravity, said null point means disposed within said null point means chamber above said top control piston chamber; and a balancing pistion connected to and disposed in spaced relationship from the under surface of said valve plug, said balancing piston connected to a balancing diaphragm sealingly disposed within said influent gas chamber to define a balancing subchamber therebelow containing air, whereby the force of the influent gas on the under surface of the valve plug tending to urge the valve plug upwardly is compensated for by the downward force of the pressure of the gas contained within the influent chamber upon the balancing piston.

2. The improved gas flow rate control regulator valve of claim 1 wherein the air contained within said balancing subchamber is supplied by and is connected to the ambient atmosphere.

3. The improved gas flow rate control regulator valve of claim 1 wherein there is a single control piston chamber, said single control piston chamber being disposed above said gas effluent chamber and communicating therewith.

4. The improved gas flow rate control regulator valve of claim 3 wherein said upper subchamber of said top control piston chamber is connected to the precombustion air and said lower subchamber thereof is connected to the effluent gas, whereby an increase in the pressure of the precombustion air urges said piston and the connected valve stem downwardly, also urging the valve plug downwardly to open the valve orifice to a greater degree to the gas influent stream therethrough, which gas in turn impinges upon the under surface of said piston within said lower piston subchamber to urge said piston upwardly to balance the downward force exerted by the precombustion air, thereby to equalize the pressure of the effluent gas stream with the pressure of the precombustion air, and thereby to equalize the flow rates thereof into the combustion chamber of the furnace.

5. The improved gas flow rate control regulator valve of claim 1 wherein said valve plug has the shape of a solid of revolution formed by rotating a convexly curved surface which intersects the longitudinal axis of the valve stem about said longitudinal axis, whereby an ellipsoidal shape is approximated.

6. The improved gas flow rate control regulator valve of claim 5 wherein the convexly curved surface comprises one of an arc of a circle less than about 90 degrees, a hyperbolic curve, a parabolic curve or an elliptical curve.

7. The improved gas flow rate control regulator valve of claim 1 wherein a gas pressure to the combustor greater than the available precombustion air pressure is necessary, said valve including amplifier means for increasing the gas pressure, wherein said at least one piston chamber comprises:

a top control piston chamber disposed above said gas effluent chamber, and a bottom control piston chamber disposed beneath said balancing subchamber and communicating therewith;

the top control piston disposed within said top control piston chamber being smaller in area than that of the bottom piston disposed within said bottom control piston chamber.

8. The improved gas flow rate control regulator valve of claim 7 wherein said upper subchamber of the bottom piston chamber communicates with the precombustion air, an increase in the pressure of which tends to urge said valve plug downwardly into an increasingly open position to increase the flow of gas therethrough into said effluent gas chamber, which gas enters and fills the communicating lower subchamber of the top piston chamber for balance against the variable precombustion air pressure of said top subchamber of said lower piston chamber, the pressure of the effluent gas being increased in proportion to the inverse ratio between the respective areas of said top and bottom pistons.

9. The improved gas flow rate control regulator valve of claim 8 wherein the upper subchamber of said top control piston chamber and the lower subchamber of said bottom control piston chamber are open to the ambient air.

10. The improved gas flow rate control regulator valve of claim 1 wherein the valve functions as a mass flow regulator suitable for use in connection with two pneumatic impulse lines each of which is disposed on a side of a restrictor disposed within the conduit in order to detect the pressure differential across the restrictor, and wherein said at least one piston chamber comprises:

a top control piston chamber disposed above said gas effluent chamber, and a bottom control piston chamber disposed beneath said balancing subchamber;

said upper chamber of the bottom control piston chamber communicating with the high pressure pneumatic impulse line disposed upstream of the restrictor, and said lower chamber of the bottom control piston communicating with the lower pressure pneumatic impulse line disposed downstream of the restrictor, whereby the relative position of said bottom piston within said bottom control piston chamber reflects the pressure differential between the upstream and downstream sides of the restrictor, and such pressure differential being equaled by the effluent gas pressure emanating from the effluent gas chamber as determined by the corresponding relative position of the top piston within said top control piston chamber.

11. The improved gas flow rate control regulator valve of claim 10 further comprising means for amplifying the effluent gas pressure to an amount greater than the pressure differential across the restrictor, and wherein said top control piston has an area less than that of said bottom control piston in an amount in inverse proportion to the increase in effluent gas pressure over the pressure differential across the restrictor.

12. The improved gas flow rate control regulator valve of claim 1 wherein said null point means comprises:

a coil spring connected at the distal end thereof to the upper end of said valve stem;

a first roller supported within said null point means chamber and having a generally horizontal axis of rotation, said coil spring disposed over said first roller;

a second roller supported within said null point means chamber having a generally vertical axis of rotation, said coil spring disposed around said second roller; and an adjustment means connected to the proximal end of said coil spring for providing variable tension on said coil spring to effectuate an upward force on said valve stem which is equal to and opposite of the downward force of gravity.

13. The improved gas flow rate control regulator valve of claim 12 wherein said second roller is generally tangentially aligned with said first roller in a generally horizontal plane, and said first roller is generally tangentially aligned with said second roller in a generally vertical plane for minimizing frictional binding of said coil spring.

* * * * *